US012717439B2

(12) United States Patent
Gesell et al.

(10) Patent No.: US 12,717,439 B2
(45) **Date of Patent: *Aug. 25, 2026**

(54) ADJUSTING TOUCH INPUT FORCE THRESHOLD

(71) Applicant: Microsoft Technology Licensing, LLC, Redmond, WA (US)

(72) Inventors: Molly Jo Gesell, Bothell, WA (US); Elizabeth Ann Pina, Lynnwood, WA (US); Adam Benjamin Meshi, Herzliya (IL); Robert Bryce Johnson, Sammamish, WA (US); Solomon Stone Romney, Bellevue, WA (US); Tal Bizinsky Tovel, Ramat HaSharon (IL); Arthur Gershfeld, Holon (IL); Hila Malihi, Jerusalem (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 2 days.

This patent is subject to a terminal disclaimer.

(21) Appl. No.: 18/974,428

(22) Filed: Dec. 9, 2024

(65) Prior Publication Data

US 2025/0103158 A1 Mar. 27, 2025

Related U.S. Application Data

(63) Continuation of application No. 18/471,029, filed on Sep. 20, 2023, now Pat. No. 12,189,883.

(51) Int. Cl.

| | |
|---|---|
| ***G06F 3/041*** | (2006.01) |
| ***G06F 3/0354*** | (2013.01) |

(52) U.S. Cl.
CPC ...... *G06F 3/04144* (2019.05); *G06F 3/03547* (2013.01); *G06F 2203/04105* (2013.01)

(58) Field of Classification Search
CPC .......... G06F 3/041; G06F 3/044; G06F 3/016; G06F 3/0414; G06F 1/1662; G06F 1/1692; G06F 1/1613; G06F 3/0227; G06F 3/0446; G06F 2203/04104; G06F 2203/04103; G06F 2203/04105; G09G 5/006; A63B 2022/0092
See application file for complete search history.

(56) References Cited

U.S. PATENT DOCUMENTS

| | | | | |
|---|---|---|---|---|
| 9,785,272 | B1 * | 10/2017 | Rosenberg | G06F 3/041661 |
| 12,189,883 | B1 * | 1/2025 | Gesell | G06F 3/04144 |
| 2017/0205944 | A1 * | 7/2017 | Kim | G06V 40/1306 |
| 2017/0269766 | A1 * | 9/2017 | Su | G06F 3/0488 |

(Continued)

*Primary Examiner* — Olga V Merkoulova
(74) *Attorney, Agent, or Firm* — Alleman Hall LLP

(57) ABSTRACT

Computing devices and related methods for adjusting a force threshold for touch input on a touchpad are disclosed. In one example, a computing device comprises a force sensing touchpad, a processor, and a memory storing instructions executable by the processor to receive a plurality of contacts on the touchpad. An area of touch of each contact is determined, and an adjusted force threshold for touch input is determined based at least on the areas of the touch of the plurality of contacts. Another contact is received on the touchpad, and a touch force of the another contact is determined. Based at least on determining that the touch force of the another contact exceeds the adjusted force threshold, a touch input on the touchpad is registered.

20 Claims, 11 Drawing Sheets

(56) References Cited

U.S. PATENT DOCUMENTS

| | | | | |
|---|---|---|---|---|
| 2017/0322661 | A1* | 11/2017 | Varje | G06F 3/044 |
| 2019/0155451 | A1* | 5/2019 | Yeh | G06F 3/0443 |
| 2021/0389862 | A1* | 12/2021 | Rosenberg | G06F 3/045 |
| 2022/0197476 | A1* | 6/2022 | Ho | G06F 3/0428 |
| 2025/0103158 | A1* | 3/2025 | Gesell | G06F 3/0418 |

* cited by examiner

| Touch Area | Adjusted Click Start Force Thresholds |
| --- | --- |
| Small Touch Area < 6 cm^2 | 110g |
| Medium Touch Area 6-11 cm^2 | 160g |
| Large Touch Area > 11cm^2 | 210g |

FIG. 6

| Touch Area | Adjusted Click Start / Click Release Force Thresholds |
| --- | --- |
| Small Touch Area < 6 cm^2 | 110g/55g |
| Medium Touch Area 6-11 cm^2 | 160g/87g |
| Large Touch Area > 11cm^2 | 210g/118g |

FIG. 7

| | Low | Medium | High |
|---|---|---|---|
| | Adjusted Click Start / Click Release Thresholds | Adjusted Click Start / Click Release Thresholds | Adjusted Click Start / Click Release Thresholds |
| Small Touch Area < 6 cm^2 | 110g/55g | 150g/95g | 190g/135g |
| Medium Touch Area 6-11 cm^2 | 160g/87g | 200g/127g | 240g/167g |
| Large Touch Area > 11cm^2 | 210g/118g | 250g/158g | 290g/198 |

FIG. 8

| Touch Area | Adjusted Click Start / Click Release Thresholds |
| --- | --- |
| Small = (1) Touch Area < 6 $cm^2$ and (2) One connected sensor grouping | 110g/55g |
| Medium = (1) Touch Area 6-11 $cm^2$ and (2) One connected sensor grouping, OR (1) Touch area ≤ 11 $cm^2$ and (2) more than one connected sensor grouping | 160g/87g |
| Large = > 11cm^2 | 210g/118g |

| | Low Sensitivity | Medium Sensitivity | High Sensitivity |
|---|---|---|---|
| | Adjusted Click Start / Click Release Thresholds | Adjusted Click Start / Click Release Thresholds | Adjusted Click Start / Click Release Thresholds |
| "Small" = (1) Touch Area < 6 $cm^2$ and (2) One connected sensor grouping | 110g/55g | 150g/95g | 190g/135g |
| "Medium" = (1) Touch Area 6-11 $cm^2$ and (2) One connected sensor grouping, OR (1) Touch area ≤ 11 $cm^2$ and (2) more than one connected sensor grouping | 160g/87g | 200g/127g | 240g/167g |
| "Large" = Touch Area > 11 $cm^2$ | 210g/118g | 250g/158g | 290g/198 |

FIG. 11

ADJUSTING TOUCH INPUT FORCE THRESHOLD

CROSS REFERENCE TO RELATED APPLICATIONS

This application is a continuation of U.S. patent application Ser. No. 18/471,029, filed Sep. 20, 2023, the entirety of which is hereby incorporated herein by reference for all purposes.

BACKGROUND

Some computing devices include a force sensing touchpad for receiving user inputs. Differently abled users can have challenges using these touchpads.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

Examples are disclosed relating to computing devices and related methods for adjusting a force threshold for touch input on a touchpad. In one example, a computing device comprises a force sensing touchpad, a processor, and a memory storing instructions executable by the processor to receive a first contact on the touchpad. An area of touch of the first contact is determined, and an adjusted force threshold for touch input is determined based at least on the area of the touch. A second contact is received on the touchpad, and a touch force of the second contact is determined. Based at least on determining that the touch force exceeds the adjusted force threshold, a touch input on the touchpad is registered.

BRIEF DESCRIPTION OF THE DRAWINGS

FIG. 6 shows an example of utilizing three different predetermined touch threshold areas to determine an adjusted force threshold for a click start (selection) according to examples of the present disclosure.

FIG. 7 shows the three different predetermined touch threshold areas of FIG. 6 mapped to adjusted force thresholds for click starts (selections) and click release (deselections) according to examples of the present disclosure.

FIG. 8 shows a matrix of the three different predetermined touch threshold areas of FIG. 6 and three sensitivity levels for adjusting force thresholds for touch inputs according to examples of the present disclosure.

FIG. 11 shows a matrix of pairs of adjusted force thresholds mapped to corresponding touch areas, number of connected sensor groupings, sensitivity level according to examples of the present disclosure.

DETAILED DESCRIPTION

Figure 1:
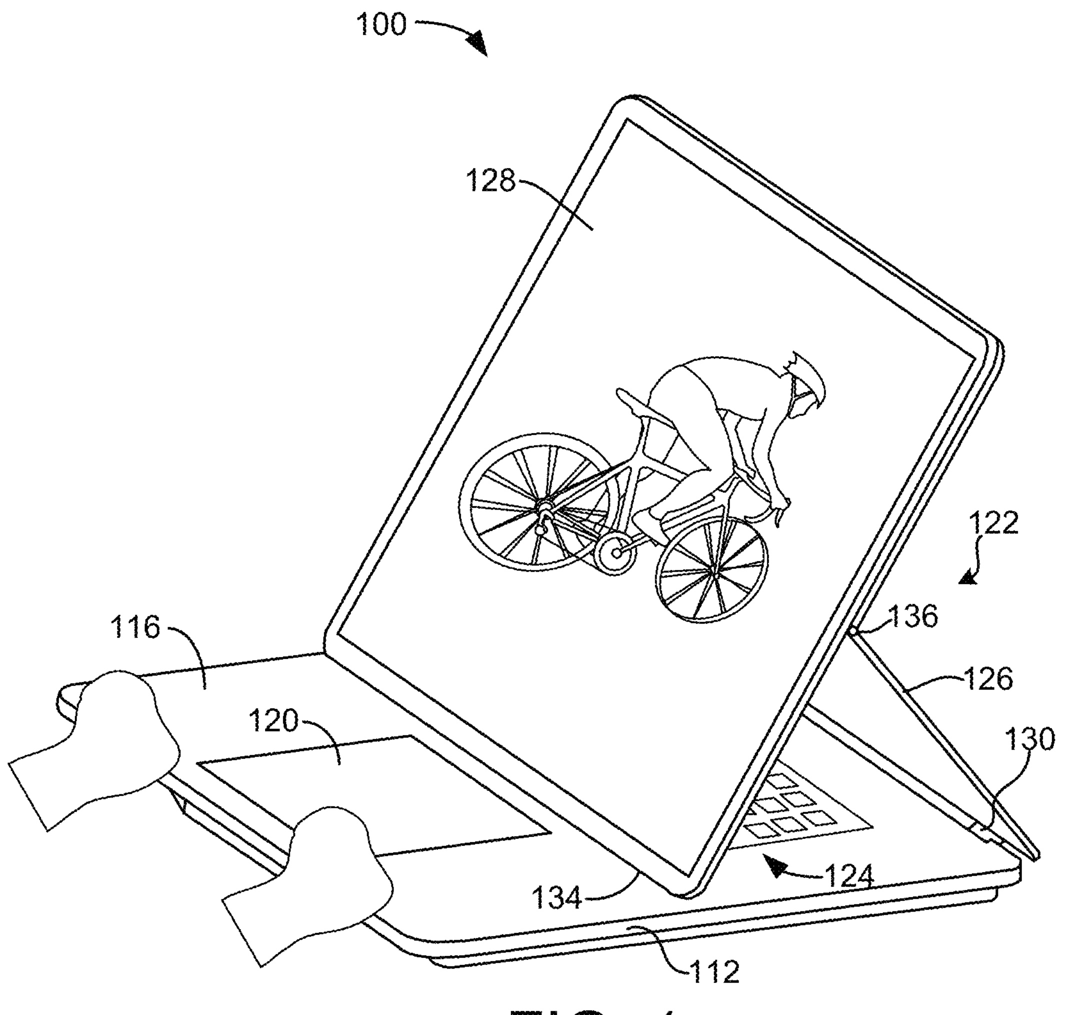
FIG. 1 shows one example of a computing device utilizing a touchpad according to examples of the present disclosure.

Some computing devices include a force sensing touchpad for receiving user inputs. Force sensing touchpads can determine various magnitudes of force being applied to their surfaces. The different levels of force can be utilized to provide different forms of user input and user interface features.

Some touchpads actively filter out non-finger contacts to prevent unintended inputs caused by inadvertent contact with the touchpad. However, some users are unable to effectively interact with touchpads using a single finger. For example, users with chronic hand pain or a limb difference can find interacting with these touchpads challenging.

Accordingly, and as described in more detail below, configurations of the present disclosure provide touchpad configurations and related methods that enable users to effectively utilize a touchpad with contact from non-fingertip input. For example, configurations of the present disclosure enable persons to use the side of their hand, another part of their hand, a knuckle, elbow, partial thumb, palm or partial palm, or other non-finger input to provide touch input via the touchpad. As described further below, configurations of the present disclosure programmatically adjust a force threshold for touch input based at least on an area of touch contact on the touchpad. In this manner, and in one potential advantage of the present disclosure, different force thresholds are selectively utilized for differently-sized areas of touch contact, thereby allowing a wide variety of users to easily control when they make and do not make touch input selections, regardless of what part or portion of their body they are using to contact the touchpad. Advantageously, by programmatically adjusting the force thresholds for touch input, configurations of the present disclosure can accommodate a wide variety of users who interact with the touchpad using fingertip and non-fingertip input.

With reference now to FIGS. 1-4 and 12, an example computing device 100 is illustrated in the form of a laptop computer that includes a force sensing touchpad 120 for estimating a force F exerted on the touchpad according to aspects of the present disclosure. In other examples, force sensing touchpads of the present disclosure can be implemented in tablet computing devices, foldable computing devices including multiple touch screens, wearable and other mobile computing devices, and any other type of computing device that utilizes a touchpad.

In this example computing device 100 includes a chassis 112 that includes a planar user interactive surface 116 comprising a touchpad 120 and a keyboard 124. Computing device 100 also includes a touch-sensitive display 128 that is rotatably coupled to chassis 112 via a display positioning assembly 122. The display 128 may have any suitable size, resolution, and utilize any suitable display technology. As examples, the display 128 may be a liquid crystal display (LCD), light emitting diode (LED) display, plasma display, quantum dot display (QLED), e-ink/e-paper display, or other suitable display type. Additional details regarding the components and computing aspects of computing device 100 are described in more detail below with reference to the example computing system of FIG. 12.

In the present example, the display positioning assembly 122 enables multiple operating orientations and positionings of display 108 that provide a user with different modes of interacting with the computing device 100. The display positioning assembly 122 includes a collapsible support member 126 that is rotatably connected to the chassis 112 at a hinge 130. The bottom edge 134 of display 128 is not rigidly affixed to the user interactive surface 116 of the chassis 112. Rather, the bottom edge 134 of display 128 is moveable to any of a range of securable display positions along the user interactive surface 116.

In some examples, the collapsible support member 126 is moveably coupled to the display 128 via a living hinge 136. In other examples, the collapsible support member 126 may be moveably coupled to the display 128 via a mechanical hinge or any other suitable coupling that enables the display portion to pivot about the support member.

As described in more detail below, and in one potential advantage of the present disclosure, using signals from the touchpad 120 the computing device 100 is configured to accurately detect the location and force of contact on the touchpad from a user's finger, thumb, and/or a variety of other body parts having different shapes and larger surface areas, such as the side of their hand, another part of their hand, a knuckle, elbow, partial thumb, palm or partial palm, or other non-finger portion of their body. In some examples and in one potential advantage described further below, signals from the touchpad 120 are processed to adjust a force threshold for touch input, thereby accommodating and accurately processing touch inputs received from a wide variety of user body parts and their surfaces.

In some examples, the touchpad 120 is a mutual capacitance touchpad. In these examples, touch inputs are identified by sampling capacitance between a driving electrode and a sensing electrode. Driving electrodes are arranged in an array within the touchpad 120. Touch detection signals are provided to each of the electrodes at a different frequency and/or at a different time. Conductive materials, such as a user's skin, draw current away from the driving electrodes when providing a touch input. The touch input can be identified by detecting this current, and a location of the touch input can be reconstructed based at least in part on determining which driving electrodes were being driven when the touch input occurred, and the frequency of the touch detection signal driving each driving electrode. In other examples, touchpads employing other touch detection technologies, including but not limited to self-capacitance and projected capacitance touch detection, can be utilized.

Figure 2:
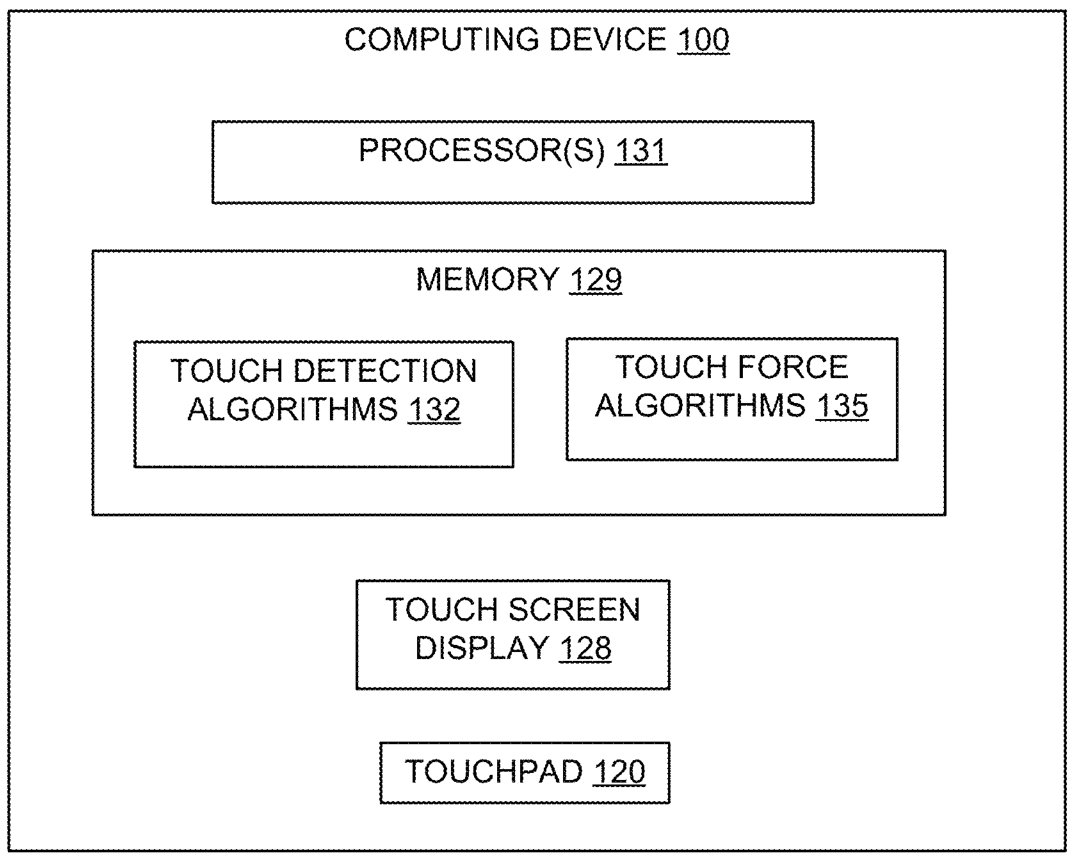
FIG. 2 shows a schematic view of selected components of the computing device of FIG. 1 according to examples of the present disclosure.

With reference now to FIG. 2, a schematic view of selected components of the example computing device 100 of FIG. 1 is provided. Computing device 100 includes memory 129 that stores instructions executable by a processor 131. For example, the memory 129 stores instructions in the form of touch detection algorithms 132 executable by the processor 131 to perform touch detection on the touchpad 120 using signals received from the touchpad. Similarly and as described in more detail below, memory 129 stores instructions in the form of touch force algorithms 135 executable by the processor 131 to adjust a force threshold for touch input on the touchpad 120. Additional details regarding memory 129, processor 131, and other components and subsystems of computing device 100 are described further below with reference to FIG. 12.

Figure 3:
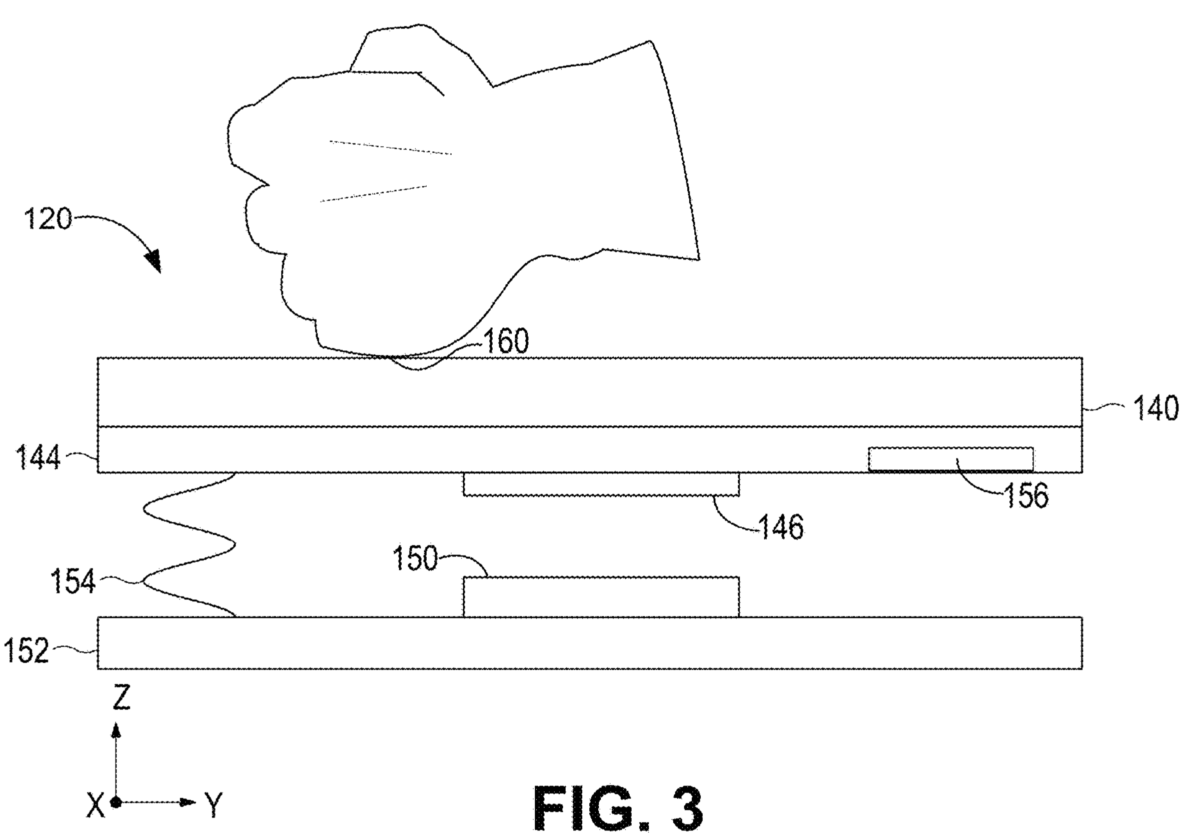
FIG. 3 shows partial schematic cross sections of the touchpad of FIG. 1.
Figure 4:
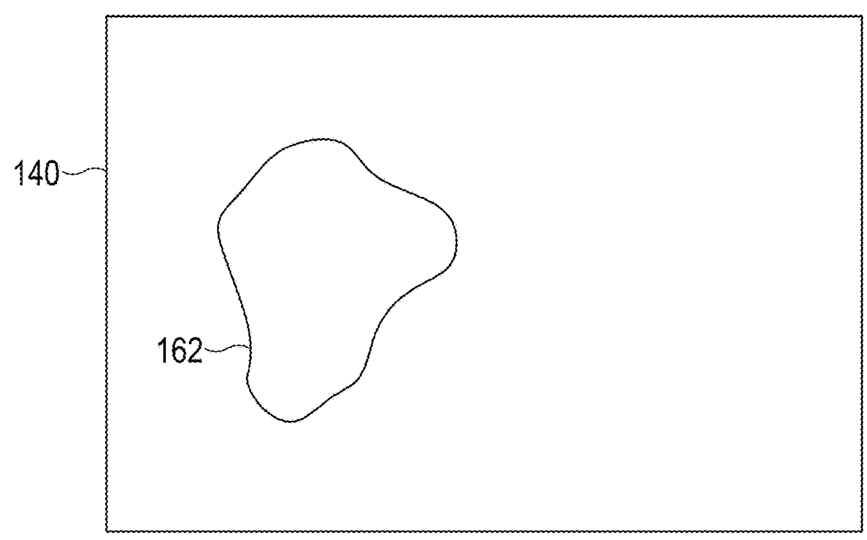
FIG. 4 shows an example of a touch map representing the area of contact on the touchpad according to examples of the present disclosure.

With reference now to FIG. 3, in one example touchpad 120 includes a cover glass layer 140 affixed to a PCB 144 by an adhesive layer (not shown). The PCB 144 includes a PCB electrode 146 that is spaced from a base plate electrode 150 located on a base plate 152. In other examples, touchpads of the present disclosure can include two or more PCB electrodes and corresponding base plate electrodes.

As schematically indicated in FIG. 3, PCB 144 is spaced from and resiliently supported relative to the base plate 152. In this example, a spring 154 resiliently supports the PCB 144 to enable movement toward and away from the base plate 152. In other examples, a variety of other configurations can be utilized to resiliently support the PCB relative to the base plate 152. For example, two or more springs may extend between the PCB 144 and base plate 152, and/or the PCB can be affixed at one end and extend over the base plate.

In different examples the base plate 152 functions as a ground and can comprise a conductive material such as aluminum, a non-conductive material such as plastic, or combinations of the foregoing. In this example the PCB 144 also includes an integrated circuit 156 configured to perform touch detection functionality via the touchpad 120 using an array of touch sensors in the upper layer of the PCB 144 to sense touch on the cover glass layer 140.

In this example, touchpad 120 also functions as a capacitive force transducer that utilizes displacement as a proxy for force. In such a parallel plate capacitor model, the capacitance is equal to the area of the PCB electrode 146 divided by the distance between the PCB electrode and the baseplate electrode 150. When a force applied to the cover glass layer 140 compresses the spring 154 and reduces this distance, the capacitance changes. In this model, the capacitance is directly proportional to the applied force.

In one example, where the area of an electrode is represented by $A_{pad}$, the initial distance between the electrode and the baseplate is do, and the change in the distance as a result of a force F applied by a user is d (F)=F/K, the capacitance as a result of the Force F is given by the following equation 1.1:

$$\text{Capacitance (Force)} = \varepsilon\frac{A_{pad}}{d_0 - d(F)} = \varepsilon\frac{A_{pad}}{d_0 - \frac{F}{K}} \qquad 1.1$$

where K is the spring constant of the spring between the PCB and the baseplate, F is the force applied by the user on the touchpad, and ε is the permittivity of the medium in the gap between the electrode and the baseplate. In this manner, a measured change in capacitance can be used to calculate the magnitude of the applied force F. In different examples, calculating the magnitude of the applied force F can include utilizing one or more formulae, such as equation 1.1, accessing precalculated data such as one or more lookup tables, and various combinations of the foregoing.

The following examples discuss aspects of the present disclosure in the context of the configuration of FIG. 3. In other examples, a variety of other capacitance-based force sensing touchpad configurations can be utilized to practice the techniques of the present disclosure. For example, in some examples a touchpad utilizes differential capacitive sensing. These touchpads include two or more linearly-aligned electrodes that are located different distances from a corresponding PCB electrode. Because the distances are different, the capacitance between each electrode and its corresponding PCB electrode is also different. This differential capacitance between the electrodes can be used to periodically recalibrate the base height of the touchpad, regardless of changes in the base height from its initial value. In other examples, strain gauges and other non-capacitance-based force sensing technologies can be utilized.

Figure 5A:
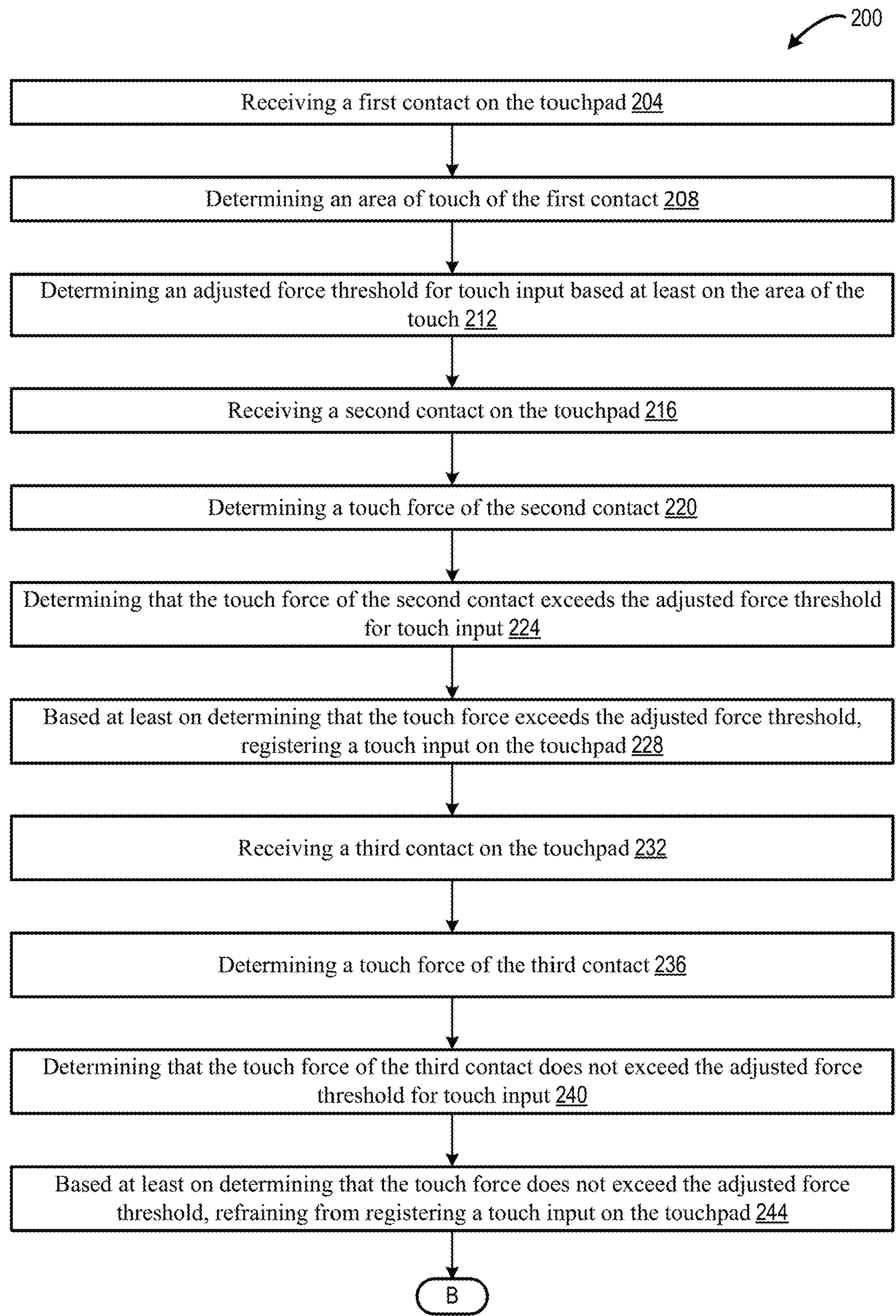
FIGS. 5A-5C are a flow chart of a method for adjusting a force threshold for touch input on a touchpad according to examples of the present disclosure.
Figure 5B:
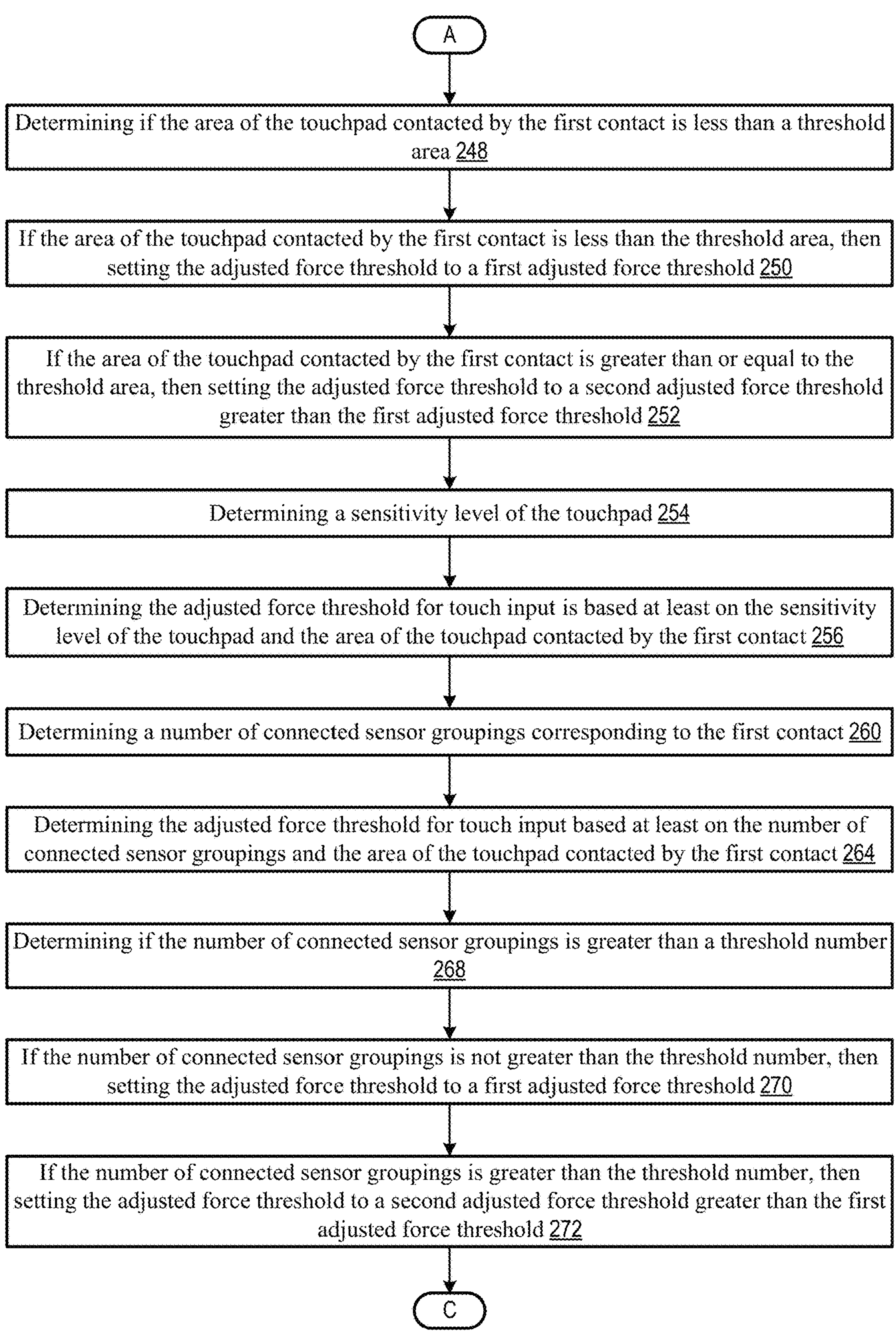
Figure 5C:
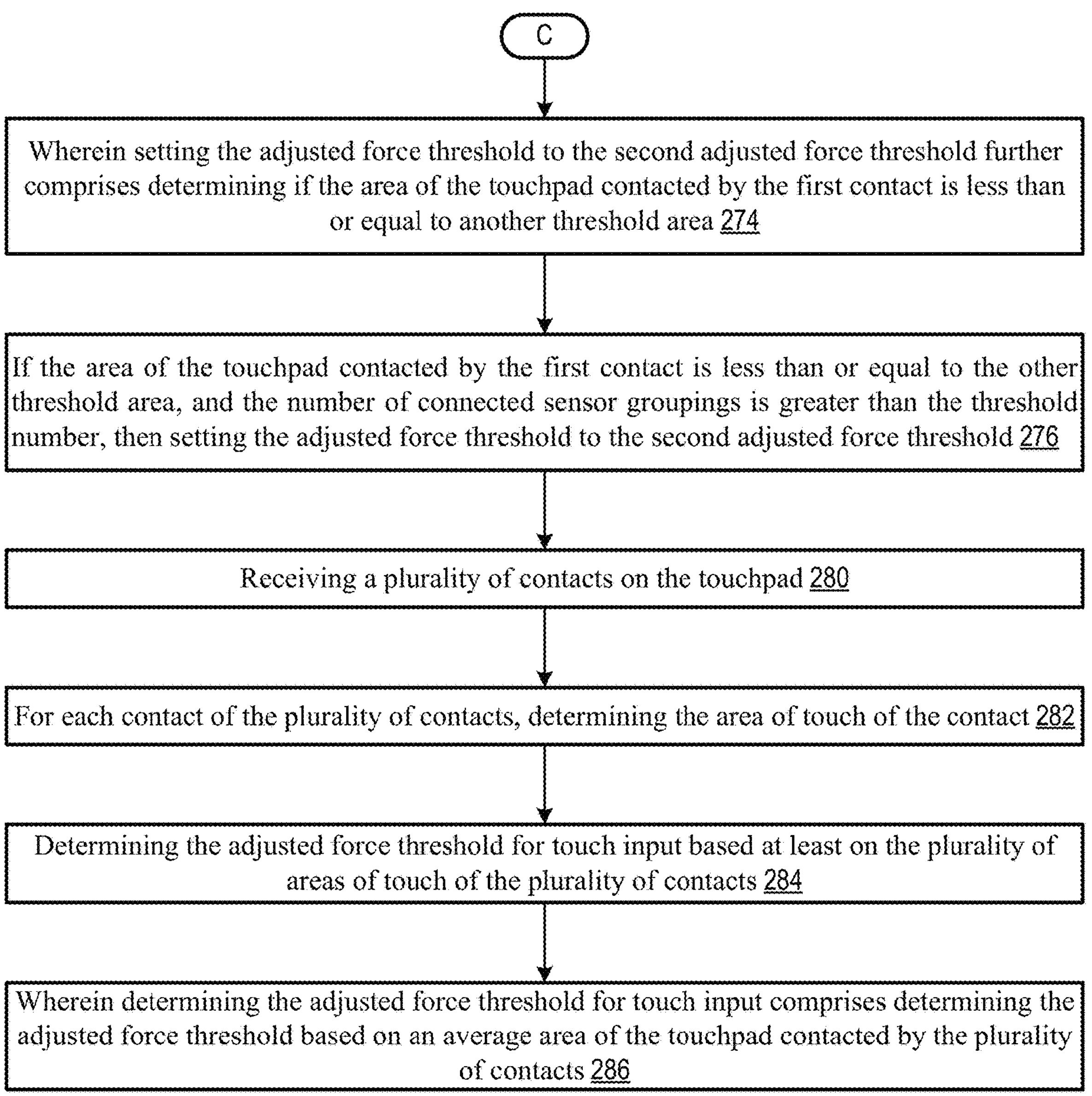

With reference now to FIGS. 5A-5C, a flow diagram is provided depicting an example method 200 for adjusting a force threshold for touch input (click start or click release) on a touchpad in a computing device according to examples of the present disclosure. The following description of method 200 is provided with reference to the computing device 100 and touchpad 120 and related components described herein and shown in FIGS. 1-4 and 12. In other examples method 200 is performed with other configurations of touchpads and computing devices, and in other contexts using other suitable devices and components.

As noted above, some force sensing touchpads actively filter out non-finger input to prevent unintended input caused by inadvertent contact with the touchpad. Some users, however, are unable to effectively interact with touchpads using a single finger. Accordingly, and as described in more detail below, aspects of method 200 enable users to effectively utilize a touchpad with contact from non-fingertip input. For example, configurations of the present disclosure enable persons to use the side of their hand, another part of their hand, a knuckle, elbow, partial thumb, palm or partial palm, or other non-finger input to effectively use the touchpad.

With reference to FIG. 5A, at 204 and with reference also to FIG. 3, method 200 includes receiving a first contact on the touchpad. In this example, a user is contacting the surface of the cover glass 140 of touchpad 120 with the side of the user's left palm 160. At 208 the method 200 includes determining an area of touch of the first contact. In one example and with reference to FIG. 4, touch detection algorithms 132 generate a touch map 162 that represents the area of contact on the cover glass 140 of the side of the user's left palm 160. In some examples, the area under touch map 162 can be determined by summing the number of touch sensors activated by the user's left palm and multiplying by a predetermined area per sensor. In other examples the area under touch map 162 can be determined in any suitable manner.

In some examples, the computing device 100 or integrated circuit 156 of the touchpad 120 sets a default force threshold for touch input. As described further below, when a user contacts the touchpad with a force greater than or equal to the default force, a touch selection is registered and provided to the computing device 100. When a user contacts the touchpad with a force less than the default force, a touch selection is not registered or provided to the computing device 100.

As described further in example use cases below, and in one potential advantage of the present disclosure, at 212 the method 200 includes determining an adjusted force threshold for touch input based at least on the area of the touch. At 216 the method 200 includes receiving a second contact on the touchpad. At 220 the method 200 includes determining a touch force of the second contact. At 224 the method 200 includes determining that the touch force of the second contact exceeds the adjusted force threshold for touch input. At 228 the method 200 includes, based at least on determining that the touch force exceeds the adjusted force threshold, registering a touch input on the touchpad.

At 232 method 200 also includes receiving a third contact on the touchpad. At 236 method 200 includes determining a touch force of the third contact. At 240 method 200 includes determining that the touch force of the third contact does not exceed the adjusted force threshold for touch input. At 244 the method 200 includes, based at least on determining that the touch force does not exceed the adjusted force threshold, refraining from registering a touch input on the touchpad.

In some examples, and in another potential advantage of the present disclosure, the disclosed configurations increase the adjusted force threshold as the area of the touch increases. Advantageously, these configurations accommodate users who may utilize larger body surface areas to contact and interact with the touchpad 120. For example, a person who uses a partial limb to interact with the touchpad 120 may use their partial limb to apply a first force and move a cursor, and apply a second, greater force to trigger the selection of displayed objects using the cursor. As the surface area of the partial limb contacting the touchpad is greater than the surface area of a single finger contacting the touchpad, the first force exerted by the partial limb on the touchpad when moving the cursor is greater than the corresponding force exerted by a single finger when moving the cursor. Accordingly, by using the area of the touch to adjust the force threshold, touchpads of the present disclosure enable persons to use a wide variety of non-finger input to effectively interact with the touchpad.

In some examples, one or more threshold areas are utilized to determine different adjusted force thresholds for touch input. With reference now to FIG. 5B, at 248 method 200 includes determining if the area of the touchpad contacted by the first contact is less than a threshold area. At 250 the method 200 includes, if the area of the touchpad contacted by the first contact is less than the threshold area, then setting the adjusted force threshold to a first adjusted force threshold. At 252 the method 200 includes, if the area of the touchpad contacted by the first contact is greater than or equal to the threshold area, then setting the adjusted force threshold to a second adjusted force threshold greater than the first adjusted force threshold.

For example and with reference now to FIG. 6, in one example three different predetermined touch threshold areas are utilized to determine an adjusted force threshold for touch input. In this example, a small touch area is defined as an area of touch that is less than 6 $cm^2$. Where the determined area of touch of a user's contact with the touchpad is less than 6 $cm^2$, a click start force (selection) threshold is set to 110 grams. A medium touch area is defined as an area of touch that is between 6 $cm^2$ and 11 $cm^2$. Where the determined area of touch of a user's contact with the touchpad is between 6 $cm^2$ and 11 $cm^2$, a click start force (selection) threshold is set to 160 grams. A large touch area is defined as an area of touch that is greater than 11 $cm^2$. Where the determined area of touch of a user's contact with the touchpad is greater than 11 $cm^2$, a click start force (selection) threshold is set to 210 grams.

Advantageously, by utilizing multiple click start force thresholds, and for each touch on the trackpad, this example adjusts the click start force threshold to provide a more appropriate value and correspondingly more effective user interaction with the touchpad. It will be appreciated that in other examples different touch areas and click start force thresholds can be utilized.

With reference now to FIG. 7, in some examples click release force thresholds are also adjusted based on the touch area of the contact. In this example, where the determined area of touch of a user's contact with the touchpad is less than 6 $cm^2$, a click release force threshold is set to 55 grams. Where the determined area of touch of a user's contact with the touchpad is between 6 $cm^2$ and 11 $cm^2$, a click release force threshold is set to 87 grams. Where the determined area of touch of a user's contact with the touchpad is greater than 11 $cm^2$, a click release force threshold is set to 118 grams. Accordingly, in another potential advantage of the present disclosure, by utilizing multiple click release force thresholds, and for each touch on the trackpad, this example adjusts the click release force threshold to provide a more appropriate value and correspondingly more effective user interaction with the touchpad. It will be appreciated that in other examples different click start release thresholds can be utilized.

In some examples, different touchpad sensitivity levels can be utilized to further customize the click start and/or click release values. In these examples and with reference again to FIG. 5B, at 254 the method 200 includes determining a sensitivity level of the touchpad. At 256 the method 200 includes determining the adjusted force threshold for touch input based at least on the sensitivity level of the touchpad and the area of the touchpad contacted by the first contact.

With reference now to FIG. 8, in one example three different sensitivity levels (low, medium, and high) are also utilized to determine an adjusted force threshold for touch input. As illustrated, as the sensitivity of the touchpad increases, the click start and click release force thresholds also increase. In some examples, a user can select and/or change the sensitivity level of the touchpad to suit her preferences.

In some examples, touchpad 120 utilizes an array of touch sensors arranged in a two-dimensional grid. When the touchpad receives a touch contact, it can group the touch sensors registering contact on the touchpad into one or more connected sensor groupings. For purposes of the present disclosure, a connected sensor grouping is defined as two or more of the sensors adjacent to one another and registering contact on the touchpad. For example, the array of touch sensors may be spaced from one another by a distance of 4 mm. Where both adjacent sensors register contact, those sensors will form at least a portion of one connected sensor grouping. Where two sensors registering contact are spaced from one another by more than 4 mm, and there are no intervening sensors registering contact that connect the two sensors, these two sensors will form portions of two different connected sensor groupings.

Figures 9, 10:
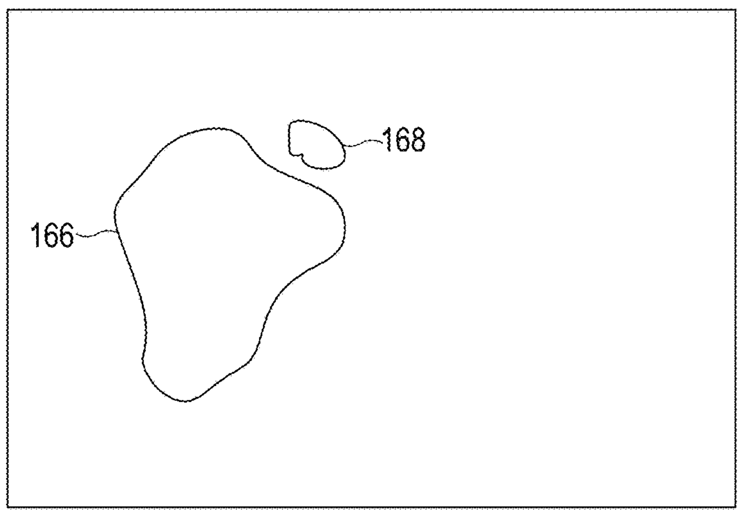
FIG. 9 shows an example of a touch map representing the areas of contact on the touchpad and touch sensors grouped into two connected sensor groupings.
FIG. 10 shows three different pairs of adjusted force thresholds determined based on touch area and the number of connected sensor groupings according to examples of the present disclosure.

With referent now to FIG. 9, in one example a person may contact the trackpad with a side of her partial left hand. In this example, the touch sensors registering contact are grouped into a first connected sensor grouping 166 and a second connected sensor grouping 168. With reference now to FIG. 5B, at 260 the method 200 includes determining a number of connected sensor groupings corresponding to the first contact. And at 264 method 200 includes determining the adjusted force threshold for touch input based at least on the number of connected sensor groupings and the area of the touchpad contacted by the first contact.

In some examples and at 268, method 200 includes determining if the number of connected sensor groupings is greater than a threshold number. At 270 method 200 includes, if the number of connected sensor groupings is not greater than the threshold number, then setting the adjusted force threshold to a first adjusted force threshold. And at 272 the method 200 includes, if the number of connected sensor groupings is greater than the threshold number, then setting the adjusted force threshold to a second adjusted force threshold greater than the first adjusted force threshold.

With reference now to FIG. 10 and in one example, click start and click release force thresholds are adjusted based on the area of the touchpad contacted by the user and the number of connected sensor groupings. In this example, where the determined area of touch of a user's contact with the touchpad is less than 6 $cm^2$ and the system determines one connected sensor grouping, click start and click release force thresholds are set to 110 g. and 55 g., respectively. Where either (A) the determined area of touch of the user's contact is between 6 $cm^2$ and 11 $cm^2$ and the system determines one connected sensor grouping, or (B) the determined area of touch of the user's contact is less than or equal to 11 $cm^2$ and the system determines more than one connected sensor grouping, the click start and click release force thresholds are set to 160 g. and 87 g., respectively. Where the determined area of touch of a user's contact with the touchpad is greater than 11 $cm^2$, regardless of the number of connected sensor groupings, the click start and click release force thresholds are set to 210 g. and 118 g., respectively. It will be appreciated that in other examples different touch areas, numbers of connected sensor groupings, and click start force thresholds can be utilized.

Accordingly, in the above example and with reference now to FIG. 5C, at 274 the method 200 includes, wherein setting the adjusted force threshold to the second adjusted force threshold further comprises determining if the area of the touchpad contacted by the first contact is less than or equal to another threshold area. And at 276 the method 200 includes, if the area of the touchpad contacted by the first contact is less than or equal to the other threshold area, and the number of connected sensor groupings is greater than the threshold number, then setting the adjusted force threshold to the second adjusted force threshold.

Accordingly, in another potential advantage of the present disclosure, by utilizing both the area of touch and the number of connected sensor groupings, and for each touch on the trackpad, this example adjusts the click start and click release force thresholds to provide more appropriate values and correspondingly more effective user interactions with the touchpad. It will be appreciated that in other examples different logic with different combinations of touch areas and numbers of connected sensor groupings can be utilized.

In some examples, different touchpad sensitivity levels also can be utilized with both the area of touch and the number of connected sensor groupings to further customize the click start and/or click release force values. With reference now to FIG. 11, in one example three different sensitivity levels (low, medium, and high) are also utilized to determine an adjusted force threshold for touch input. As illustrated, as the sensitivity of the touchpad increases, the click start and click release force thresholds also increase. In some examples, a user can select and/or change the sensitivity level of the touchpad to suit her preferences.

In some examples user engagement with the touchpad can be tracked over time and utilized to programmatically adjust the force threshold for touch input. With reference again to FIG. 5C, at 280 the method 200 includes receiving a plurality of contacts on the touchpad. At 282 the method 200 includes, for each contact of the plurality of contacts, determining the area of touch of the contact. At 284 the method 200 includes determining the adjusted force threshold for touch input based at least on the areas of touch of the plurality of contacts.

In one example and at 286 the method 200 includes wherein determining the adjusted force threshold for touch input comprises determining the adjusted force threshold based on an average area of the touchpad contacted by the plurality of contacts. For example, the computing device 100 can determine the area of contact on the touchpad of each user interaction with the touchpad over predetermined period of time or number of contacts. The computing device 100 can then compute the average of these areas of contact and utilize this average area of contact to determine the adjusted force threshold for touch input. In this example and in another potential advantage of the present disclosure, a user's interactions with the trackpad are monitored over time to develop an average area of contact that can more accurately represent the user's typical manner of interacting with the touchpad.

In some examples, touch force algorithms of the present disclosure can identify one or more patterns corresponding to a user's interactions with the touchpad over time, and adjust the force threshold for touch input based at least on the pattern(s). In one example, each time a user initially engages with the touchpad intending to provide a touch input, she applies an initial force that is below the threshold force for touch input, and thus no input is registered by the computing device. In each case the user rests briefly and then touches the touchpad a second time with a higher force that exceeds the threshold force.

In this example, logic in the touch force algorithms can learn this pattern of interaction over time and identify a recurring pattern of (1) a first unsuccessful interaction attempt (average touch force is too low), then within 10 seconds (2) a second successful interaction attempt (higher force exceeding the threshold force). In response to identifying this pattern, the touch force algorithms determine an adjusted, lower force threshold for touch input that is lower than the user's typical force applied in her first interaction attempts. For example, where an initial force threshold is 150 g. and the user's average force applied in her first attempts at user interaction is 135 g. the touch force algorithms can lower the force threshold to 125 g. In some examples this monitoring and adjustment process can be performed periodically to maintain an appropriate force threshold level for registering touch inputs that matches the user's actual interactions with the touchpad.

Figure 12:
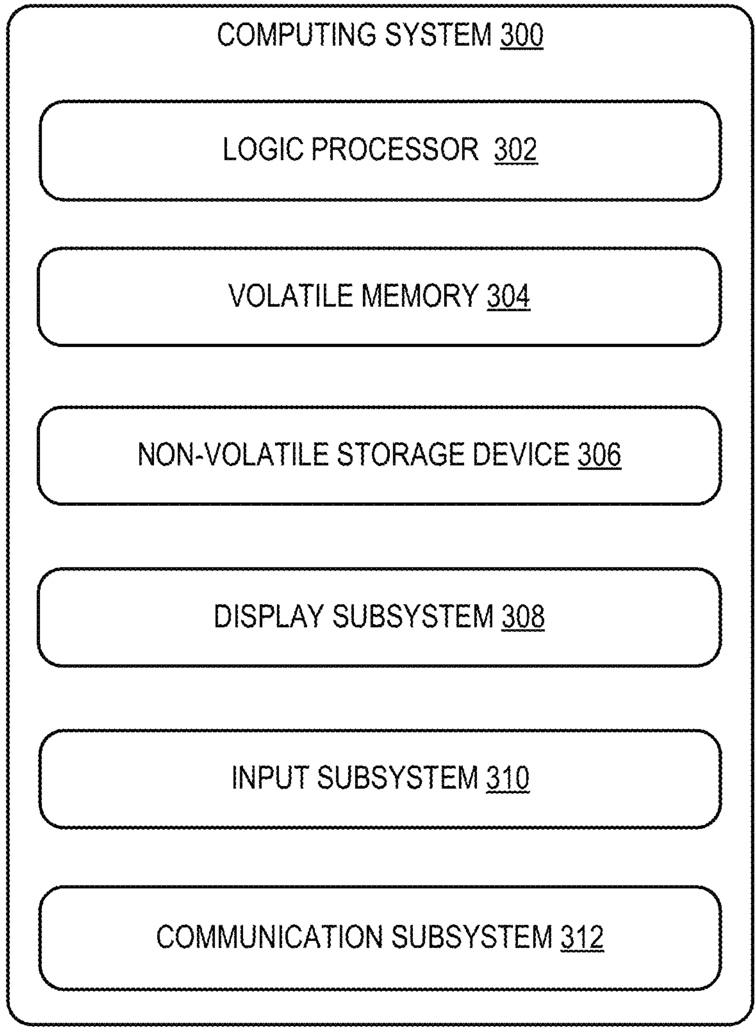
FIG. 12 shows a block diagram of an example computing system according to examples of the present disclosure.

In some embodiments, the touchpads and components described herein may be utilized with a computing system of one or more computing devices. Similarly, the methods and processes described herein may be implemented as a computer-application program or service, an application-programming interface (API), a library, and/or other computer-program product. FIG. 12 schematically shows a non-limiting embodiment of a computing system 300 configured to provide any to all of the compute functionality described herein. Computing system 300 is shown in simplified form.

The laptop computing device 100 described above may comprise computing system 300 or one or more aspects of computing system 300. Computing system 300 may take the form of one or more laptops, personal computers, server computers, tablet computers, home-entertainment computers, gaming devices, mobile computing devices, mobile communication devices (e.g., smart phone), wearable computing devices, and/or other computing devices.

Computing system 300 includes a logic processor 302, volatile memory 304, and a non-volatile storage device 306. Computing system 300 may optionally include a display subsystem 308, input subsystem 310, communication subsystem 312, and/or other components not shown in FIG. 12.

Logic processor 302 includes one or more physical devices configured to execute instructions. For example, the logic processor may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors (hardware) configured to execute software instructions. Additionally or alternatively, the logic processor may include one or more hardware logic circuits or firmware devices configured to execute hardware-implemented logic or firmware instructions. Processors of the logic processor 302 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood.

Volatile memory 304 may include physical devices that include random access memory (RAM). Volatile memory 304 is typically utilized by logic processor 302 to temporarily store information during processing of software instructions. It will be appreciated that volatile memory 304 typically does not continue to store instructions when power is cut to the volatile memory 304.

Non-volatile storage device 306 includes one or more physical devices configured to hold instructions executable by the logic processors to implement the methods and processes described herein. When such methods and processes are implemented, the state of non-volatile storage device 306 may be transformed—e.g., to hold different data.

Non-volatile storage device 306 may include physical devices that are removable and/or built-in. Non-volatile storage device 306 may include optical memory (e.g., CD, DVD, HD-DVD, Blu-Ray Disc, etc.), semiconductor memory (e.g., ROM, EPROM, EEPROM, FLASH memory, etc.), magnetic memory (e.g., hard-disk drive, floppy-disk drive, tape drive, MRAM, etc.), and/or other mass storage device technology. Non-volatile storage device 306 may include nonvolatile, dynamic, static, read/write, read-only, sequential-access, location-addressable, file-addressable, and/or content-addressable devices. It will be appreciated that non-volatile storage device 306 is configured to hold instructions even when power is cut to the non-volatile storage device 306.

Aspects of logic processor 302, volatile memory 304, and non-volatile storage device 306 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

When included, display subsystem 308 may be used to present a visual representation of data held by non-volatile storage device 306. As the herein described methods and processes change the data held by the non-volatile storage device, and thus transform the state of the non-volatile storage device, the state of display subsystem 308 may likewise be transformed to visually represent changes in the underlying data. Display subsystem 308 may include one or more display devices utilizing virtually any type of technology. Such display devices may be combined with logic processor 302, volatile memory 304, and/or non-volatile storage device 306 in a shared enclosure, or such display devices may be peripheral display devices.

Input subsystem 310 may comprise or interface with one or more user-input devices such as touchpad 120, keyboard 124, touch screen display 128, a mouse, electronic pen, stylus, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity; and/or any other suitable sensor.

When included, communication subsystem 312 may be configured to communicatively couple various computing devices described herein with each other, and with other devices. Communication subsystem 312 may include wired and/or wireless communication devices compatible with one or more different communication protocols. As non-limiting examples, the communication subsystem may be configured for communication via a wireless telephone network, or a wired or wireless local- or wide-area network, such as an HDMI over Wi-Fi connection. In some embodiments, the communication subsystem may allow computing system 300 to send and/or receive messages to and/or from other devices via a network such as the Internet.

The following paragraphs provide additional support for the claims of the subject application. One aspect provides a method for adjusting a force threshold for touch input on a touchpad in a computing device, the method comprising: receiving a first contact on the touchpad; determining an area of touch of the first contact; determining an adjusted force threshold for touch input based at least on the area of the touch; receiving a second contact on the touchpad; determining a touch force of the second contact; determining that the touch force of the second contact exceeds the adjusted force threshold for touch input; and based at least on determining that the touch force exceeds the adjusted force threshold, registering a touch input on the touchpad. The method may additionally or alternatively include, wherein determining the adjusted force threshold for touch input based at least on the area of the touchpad contacted by the first contact comprises: determining if the area of the touchpad contacted by the first contact is less than a threshold area; if the area of the touchpad contacted by the first contact is less than the threshold area, then setting the adjusted force threshold to a first adjusted force threshold; and if the area of the touchpad contacted by the first contact is greater than or equal to the threshold area, then setting the adjusted force threshold to a second adjusted force threshold greater than the first adjusted force threshold. The method may additionally or alternatively include determining a sensitivity level of the touchpad, and wherein determining the adjusted force threshold for touch input is based at least on the sensitivity level of the touchpad and the area of the touchpad contacted by the first contact. The method may additionally or alternatively include, wherein the touchpad comprises an array of sensors, and a connected sensor grouping is defined as two or more of the sensors adjacent to one another and registering contact on the touchpad, the method further comprising determining a number of connected sensor groupings corresponding to the first contact, wherein determining the adjusted force threshold for touch input is based at least on the number of connected sensor groupings and the area of the touchpad contacted by the first contact. The method may additionally or alternatively include, wherein determining the adjusted force threshold for touch input based at least on the number of connected sensor groupings and the area of the touchpad contacted by the first contact comprises: determining if the number of connected sensor groupings is greater than a threshold number; if the number of connected sensor groupings is not greater than the threshold number, then setting the adjusted force threshold to a first adjusted force threshold; and if the number of connected sensor groupings is greater than the threshold number, then setting the adjusted force threshold to a second adjusted force threshold greater than the first adjusted force threshold. The method may additionally or alternatively include, wherein setting the adjusted force threshold to the second adjusted force threshold further comprises: determining if the area of the touchpad contacted by the first contact is less than or equal to another threshold area; and if the number of connected sensor groupings is greater than the threshold number and the area of the touchpad contacted by the first contact is less than or equal to the another threshold area, then setting the adjusted force threshold to the second adjusted force threshold. The method may additionally or alternatively include receiving a third contact on the touchpad; determining a touch force of the third contact; determining that the touch force of the third contact does not exceed the adjusted force threshold for touch input; and based at least on determining that the touch force does not exceed the adjusted force threshold, refraining from registering a touch input on the touchpad. The method may additionally or alternatively include, receiving a plurality of contacts on the touchpad; for each contact of the plurality of contacts, determining the area of touch of the contact; and determining the adjusted force threshold for touch input based at least on the plurality of areas of touch of the plurality of contacts. The method may additionally or alternatively include, wherein determining the adjusted force threshold for touch input comprises determining the adjusted force threshold based on an average area of the touchpad contacted by the plurality of contacts.

Another aspect provides computing device, comprising: a force sensing touchpad; a processor; and a memory storing instructions executable by the processor to: receive a first contact on the touchpad; determine an area of touch of the first contact; determine an adjusted force threshold for touch input based at least on the area of the touch; receive a second contact on the touchpad; determine a touch force of the second contact; determine that the touch force of the second contact exceeds the adjusted force threshold for touch input; and based at least on determining that the touch force exceeds the adjusted force threshold, register a touch input on the touchpad. The computing device may additionally or alternatively include, wherein determining the adjusted force threshold for touch input based at least on the area of the touchpad contacted by the first contact comprises: determining if the area of the touchpad contacted by the first contact is less than a threshold area; if the area of the touchpad contacted by the first contact is less than the threshold area, then setting the adjusted force threshold to a first adjusted force threshold; and if the area of the touchpad contacted by the first contact is greater than or equal to the threshold area, then setting the adjusted force threshold to a second adjusted force threshold greater than the first adjusted force threshold. The computing device may additionally or alternatively include wherein the instructions are executable to determine a sensitivity level of the touchpad, and wherein determining the adjusted force threshold for touch input is based at least on the sensitivity level of the touchpad and the area of the touchpad contacted by the first contact. The computing device may additionally or alternatively include, wherein the touchpad comprises an array of sensors, and a connected sensor grouping is defined as two or more of the sensors adjacent to one another and registering contact on the touchpad, and the instructions are executable to determine a number of connected sensor groupings corresponding to the first contact, wherein determining the adjusted force threshold for touch input is based at least on the number of connected sensor groupings and the area of the touchpad contacted by the first contact. The computing device may additionally or alternatively include, wherein determining the adjusted force threshold for touch input based at least on the number of connected sensor groupings and the area of the touchpad contacted by the first contact comprises: determining if the number of connected sensor groupings is greater than a threshold number; if the number of connected sensor groupings is not greater than the threshold number, then setting the adjusted force threshold to a first adjusted force threshold; and if the number of connected sensor groupings is greater than the threshold number, then setting the adjusted force threshold to a second adjusted force threshold greater than the first adjusted force threshold. The computing device may additionally or alternatively include, wherein setting the adjusted force threshold to the second adjusted force threshold further comprises: determining if the area of the touchpad contacted by the first contact is less than or equal to another threshold area; and if the number of connected sensor groupings is greater than the threshold number and the area of the touchpad contacted by the first contact is less than or equal to the another threshold area, then setting the adjusted force threshold to the second adjusted force threshold. The computing device may additionally or alternatively include, wherein the instructions are executable to: receive a third contact on the touchpad; determine a touch force of the third contact; determine that the touch force of the third contact does not exceed the adjusted force threshold for touch input; and based at least on determining that the touch force does not exceed the adjusted force threshold, refrain from registering a touch input on the touchpad. The computing device may additionally or alternatively include, wherein the instructions are executable to: receive a plurality of contacts on the touchpad; for each contact of the plurality of contacts, determine the area of touch of the contact; and determine the adjusted force threshold for touch input based at least on the plurality of areas of touch of the plurality of contacts. The computing device may additionally or alternatively include, wherein determining the adjusted force threshold for touch input comprises determining the adjusted force threshold based on an average area of the touchpad contacted by the plurality of contacts.

Another aspect provides a computing device, comprising: a force sensing touchpad comprising an array of sensors, wherein a connected sensor grouping is defined as two or more of the sensors adjacent to one another and registering contact on the touchpad; a processor; and a memory storing instructions executable by the processor to: receive a first contact on the touchpad; determine an area of the touchpad contacted by the first contact; determine a number of connected sensor groupings corresponding to the first contact; determine if the area of the touchpad contacted by the first contact is less than a threshold area; if the area of the touchpad contacted by the first contact is less than the threshold area, and the number of connected sensor groupings corresponding to the first contact is not greater than the threshold number, then setting an adjusted force threshold to a first adjusted force threshold; and if the area of the touchpad contacted by the first contact is greater than or equal to the threshold area, then setting the adjusted force threshold to a second adjusted force threshold greater than the first adjusted force threshold; receive a second contact on the touchpad; determine a touch force of the second contact; determine that the touch force of the second contact exceeds the adjusted force threshold for touch input; and based at least on determining that the touch force exceeds the adjusted force threshold, register a touch input on the touchpad. The computing device may additionally or alternatively include, wherein the instructions are executable to determine a sensitivity level of the touchpad, and wherein setting the adjusted force threshold to a first adjusted force threshold is based at least on the sensitivity level of the touchpad, the area of the touchpad contacted by the first contact, and the number of connected sensor groupings corresponding to the first contact.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A method for adjusting a force threshold for touch input on a touchpad in a computing device, the method comprising:

receiving a plurality of contacts on the touchpad;

for each contact of the plurality of contacts, determining an area of touch of the contact;

determining an adjusted force threshold for touch input based at least on the areas of touch of the plurality of contacts;

receiving another contact on the touchpad;

determining a touch force of the another contact;

determining that the touch force of the another contact exceeds the adjusted force threshold for touch input; and based at least on determining that the touch force exceeds the adjusted force threshold, registering a touch input on the touchpad.

2. The method of claim 1, wherein determining the adjusted force threshold for touch input comprises determining the adjusted force threshold based at least on an average area of the touchpad contacted by the plurality of contacts.

3. The method of claim 2, wherein determining the adjusted force threshold based at least on the average area of the touchpad contacted by the plurality of contacts further comprises determining the area of contact on the touchpad of each user interaction with the touchpad over a predetermined period of time.

4. The method of claim 2, wherein determining the adjusted force threshold based at least on the average area of the touchpad contacted by the plurality of contacts further comprises determining the area of contact on the touchpad of each user interaction with the touchpad over a predetermined number of contacts.

5. The method of claim 2, wherein determining the adjusted force threshold for touch input based at least on the average area of the touchpad contacted by the plurality of contacts comprises:

determining if the average area is less than a threshold area;

if the average area is less than the threshold area, then setting the adjusted force threshold to a first adjusted force threshold; and if the average area is greater than or equal to the threshold area, then setting the adjusted force threshold to a second adjusted force threshold greater than the first adjusted force threshold.

6. The method of claim 1, further comprising determining a sensitivity level of the touchpad, and wherein determining the adjusted force threshold for touch input is based at least on the sensitivity level of the touchpad and the areas of touch of the plurality of contacts.

7. The method of claim 1, wherein the touchpad comprises an array of sensors, and a connected sensor grouping is defined as two or more of the sensors adjacent to one another and registering contact on the touchpad, the method further comprising determining a number of connected sensor groupings corresponding to the plurality of contacts, wherein determining the adjusted force threshold for touch input is based at least on the number of connected sensor groupings and the areas of touch of the plurality of contacts.

8. The method of claim 7, wherein determining the adjusted force threshold for touch input based at least on the number of connected sensor groupings and the areas of touch of the plurality of contacts comprises:

determining if the number of connected sensor groupings is greater than a threshold number;

if the number of connected sensor groupings is not greater than the threshold number, then setting the adjusted force threshold to a first adjusted force threshold; and if the number of connected sensor groupings is greater than the threshold number, then setting the adjusted force threshold to a second adjusted force threshold greater than the first adjusted force threshold.

9. The method of claim 8, wherein setting the adjusted force threshold to the second adjusted force threshold further comprises:

determining if the areas of touch of the plurality of contacts are less than or equal to another threshold area; and if the number of connected sensor groupings is greater than the threshold number and the areas of touch of the plurality of contacts are less than or equal to the another threshold area, then setting the adjusted force threshold to the second adjusted force threshold.

10. The method of claim 1, further comprising:

receiving a subsequent contact on the touchpad;

determining a touch force of the subsequent contact;

determining that the touch force of the subsequent contact does not exceed the adjusted force threshold for touch input; and based at least on determining that the touch force does not exceed the adjusted force threshold, refraining from registering a touch input on the touchpad.

11. A computing device, comprising:

a force sensing touchpad;

a processor; and a memory storing instructions executable by the processor to:

receive a plurality of contacts on the touchpad;

for each contact of the plurality of contacts, determine an area of touch of the contact;

determine an adjusted force threshold for touch input based at least on the areas of touch of the plurality of contacts;

receive another contact on the touchpad;

determine a touch force of the another contact;

determine that the touch force of the another contact exceeds the adjusted force threshold for touch input; and based at least on determining that the touch force exceeds the adjusted force threshold, register a touch input on the touchpad.

12. The computing device of claim 11, wherein determining the adjusted force threshold for touch input comprises determining the adjusted force threshold based at least on an average area of the touchpad contacted by the plurality of contacts.

13. The computing device of claim 12, wherein determining the adjusted force threshold based at least on the average area of the touchpad contacted by the plurality of contacts further comprises determining the area of contact on the touchpad of each user interaction with the touchpad over a predetermined period of time.

14. The computing device of claim 12, wherein determining the adjusted force threshold based at least on the average area of the touchpad contacted by the plurality of contacts further comprises determining the area of contact on the touchpad of each user interaction with the touchpad over a predetermined number of contacts.

15. The computing device of claim 12, wherein determining the adjusted force threshold for touch input based at least on the average area of the touchpad contacted by the plurality of contacts comprises:

determining if the average area is less than a threshold area;

if the average area is less than the threshold area, then setting the adjusted force threshold to a first adjusted force threshold; and if the average area is greater than or equal to the threshold area, then setting the adjusted force threshold to a second adjusted force threshold greater than the first adjusted force threshold.

16. The computing device of claim 11, wherein the instructions are executable to determine a sensitivity level of the touchpad, and wherein determining the adjusted force threshold for touch input is based at least on the sensitivity level of the touchpad and the areas of touch of the plurality of contacts.

17. The computing device of claim 11, wherein the touchpad comprises an array of sensors, and a connected sensor grouping is defined as two or more of the sensors adjacent to one another and registering contact on the touchpad, and the instructions are executable to determine a number of connected sensor groupings corresponding to the plurality of contacts, wherein determining the adjusted force threshold for touch input is based at least on the number of connected sensor groupings and the areas of touch of the plurality of contacts.

18. The computing device of claim 17, wherein determining the adjusted force threshold for touch input based at least on the number of connected sensor groupings and the areas touch of the plurality of contacts comprises:

determining if the number of connected sensor groupings is greater than a threshold number;

if the number of connected sensor groupings is not greater than the threshold number, then setting the adjusted force threshold to a first adjusted force threshold; and if the number of connected sensor groupings is greater than the threshold number, then setting the adjusted force threshold to a second adjusted force threshold greater than the first adjusted force threshold.

19. The computing device of claim 18, wherein setting the adjusted force threshold to the second adjusted force threshold further comprises:

determining if the areas of touch of the plurality of contacts is less than or equal to another threshold area; and if the number of connected sensor groupings is greater than the threshold number and the areas of touch of the plurality of contacts are less than or equal to the another threshold area, then setting the adjusted force threshold to the second adjusted force threshold.

20. A computing device, comprising:

a force sensing touchpad comprising an array of sensors, wherein a connected sensor grouping is defined as two or more of the sensors adjacent to one another and registering contact on the touchpad;

a processor; and a memory storing instructions executable by the processor to:

receive a plurality of contacts on the touchpad;

for each contact of the plurality of contacts, determine an area of touch of the contact;

determine a sensitivity level of the touchpad;

determine a number of connected sensor groupings corresponding to the plurality of contacts;

determine an adjusted force threshold for touch input based at least on the areas of touch of the plurality of contacts, the sensitivity level of the touchpad, and the number of connected sensor groupings;

receive another contact on the touchpad;

determine a touch force of the another contact;

determine that the touch force of the another contact exceeds the adjusted force threshold for touch input; and based at least on determining that the touch force exceeds the adjusted force threshold, register a touch input on the touchpad.

* * * * *